United States Patent
Tanaka et al.

(10) Patent No.: US 8,244,009 B2
(45) Date of Patent: Aug. 14, 2012

(54) IMAGE ANALYSIS DEVICE

(75) Inventors: Hideki Tanaka, Tama (JP); Hirokazu Nishimura, Hachioji (JP); Kenji Nakamura, Chiba (JP); Ryoko Inoue, Hachioji (JP); Miho Sawa, Hino (JP)

(73) Assignee: Olympus Medical Systems Corp., Tokyo (JP)

( * ) Notice: Subject to any disclaimer, the term of this patent is extended or adjusted under 35 U.S.C. 154(b) by 921 days.

(21) Appl. No.: 12/208,904

(22) Filed: Sep. 11, 2008

(65) Prior Publication Data

US 2009/0074270 A1   Mar. 19, 2009

Related U.S. Application Data

(63) Continuation of application No. PCT/JP2007/054214, filed on Mar. 5, 2007.

(30) Foreign Application Priority Data

Mar. 14, 2006   (JP) .................................. 2006-069818

(51) Int. Cl.
    *G06K 9/00* (2006.01)
(52) U.S. Cl. ..................... 382/128; 382/131; 382/132
(58) Field of Classification Search .................. 382/128, 382/130, 131, 132
    See application file for complete search history.

(56) References Cited

U.S. PATENT DOCUMENTS

| | | | |
|---|---|---|---|
| 6,580,818 B2 * | 6/2003 | Karssemeijer et al. ....... | 382/128 |
| 6,947,784 B2 * | 9/2005 | Zalis .............................. | 600/425 |
| 7,043,064 B2 * | 5/2006 | Paik et al. ..................... | 382/128 |
| 7,260,250 B2 * | 8/2007 | Summers et al. ............. | 382/128 |
| 7,379,342 B2 * | 5/2008 | Park et al. ................ | 365/185.22 |
| 2005/0036691 A1 | 2/2005 | Cathier | |

FOREIGN PATENT DOCUMENTS

| | | |
|---|---|---|
| JP | 04-193254 | 7/1992 |
| JP | 2005-157902 | 6/2005 |
| WO | WO 2005/020153 A1 | 3/2005 |
| WO | WO 2005/031648 A2 | 4/2005 |
| WO | WO 2005/050544 A1 | 6/2005 |
| WO | WO 2005/101314 A2 | 10/2005 |

OTHER PUBLICATIONS

Chinese Office Action dated Mar. 11, 2010.
Yamaguchi, Y, et al., "Usability of Magnifying Endoscope in Gastric Cancer Diagnosis", Digestive Endoscopy vol. 13, No. 3, 2001, pp. 349-354.
Wei, J, et al., Characteristic Analysis of Convergence Index Filters, D-II, vol. J84-DII, No. 7, pp. 1289-1298.
Extended Supplementary European Search Report dated Apr. 23, 2010.
Extended European Search Report dated Jun. 1, 2012 issued in counterpart European Patent Application No. 12001445.1.

* cited by examiner

*Primary Examiner* — Louis Arana
(74) *Attorney, Agent, or Firm* — Scully, Scott, Murphy & Presser, P.C.

(57) ABSTRACT

A CPU executes a gray value gradient calculation process to, for example, an R signal in step S10, executes an isotropic change feature value calculation process based on a gray value gradient calculated in step S11, and further executes a possible polyp detection process for generating a possible polyp image at a location where a polyp exists based on an isotropic change feature value calculated in step S12. This improves the detection of an existing location of an intraluminal abnormal tissue.

4 Claims, 13 Drawing Sheets

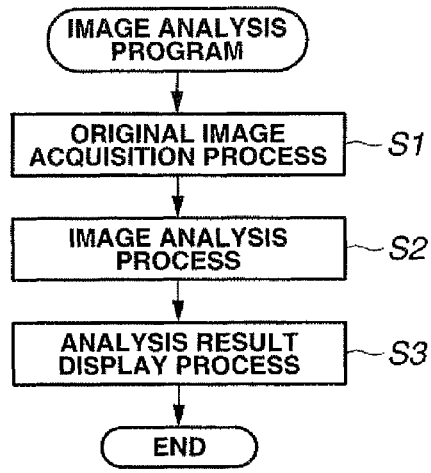
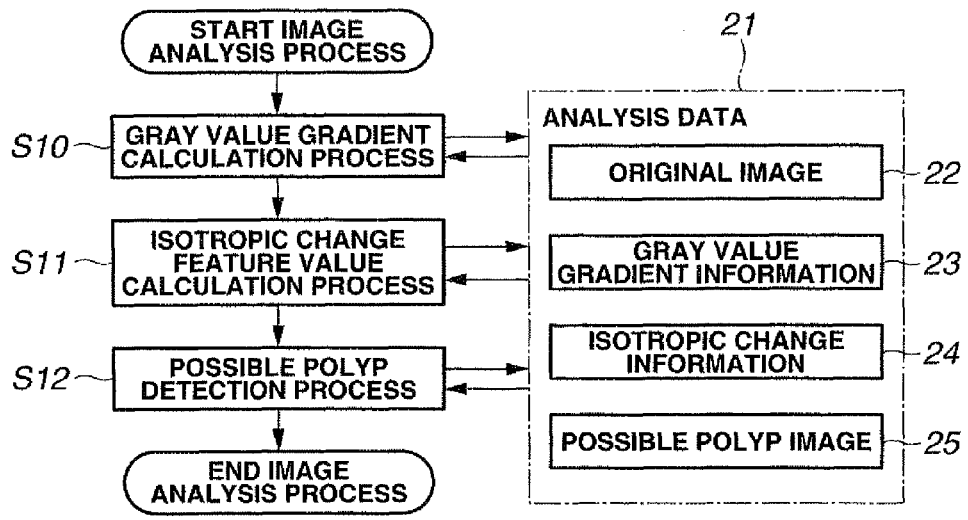
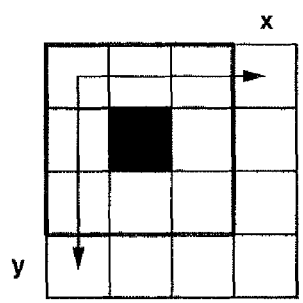

FIG.10

|  |  |  | R11'y | R21'y | R31'y |  |  |  |
|---|---|---|---|---|---|---|---|---|
|  |  |  | R12'y | R22'y | R32'y |  |  |  |
|  |  |  | R13'y | R23'y | R33'y |  |  |  |
| R11'x | R21'x | R31'x | R11 | R21 | R31 | R11x | R21x | R31x |
| R12'x | R22'x | R32'x | R12 | R22 | R32 | R12x | R22x | R32x |
| R13'x | R23'x | R33'x | R13 | R23 | R33 | R13x | R23x | R33x |
|  |  |  | R11y | R21y | R31y |  |  |  |
|  |  |  | R12y | R22y | R32y |  |  |  |
|  |  |  | R13y | R23y | R33y |  |  |  | g22x=R22x−R22
g22y=R22y−R22
rg22x=R'22x−R22
rg22y=R'22y−R22 gx=AVE(gijx)=AVE(Rijx−Rij)
gy=AVE(gijy)=AVE(Rijy−Rij)
rgx=AVE(rgijx)=AVE(Rij'x−Rij)
rgy=AVE(rgijy)=AVE(Rij'y−Rij)   i,j=1~3

→ dxy=ABS(gx−gy)
dxrx=ABS(gx−rgx)
dxry=ABS(gx−rgy)

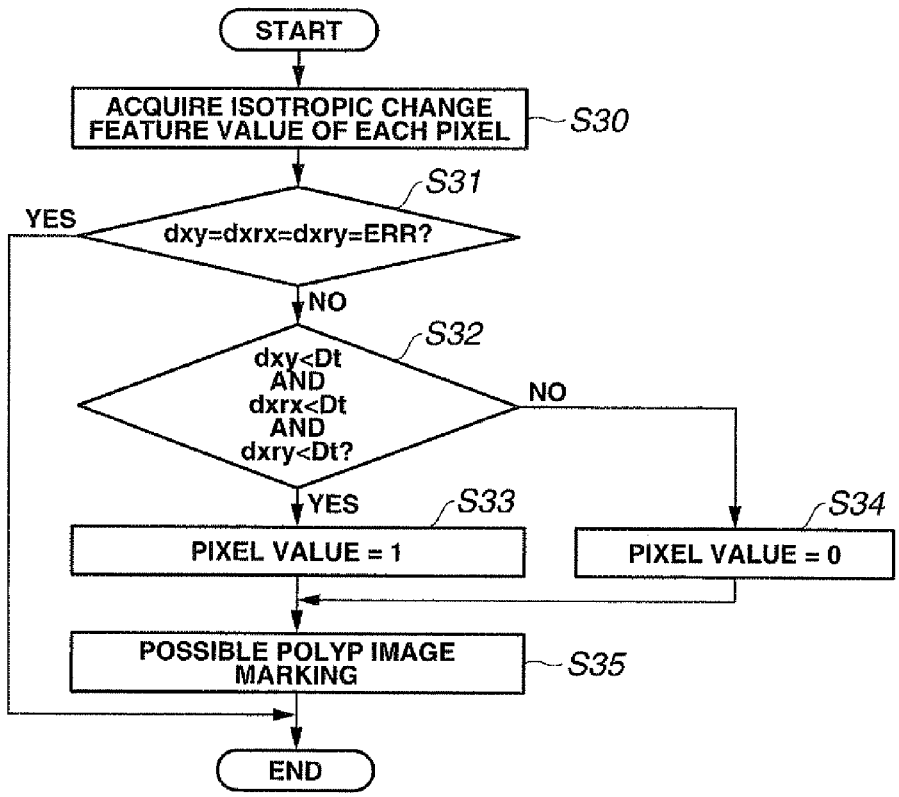

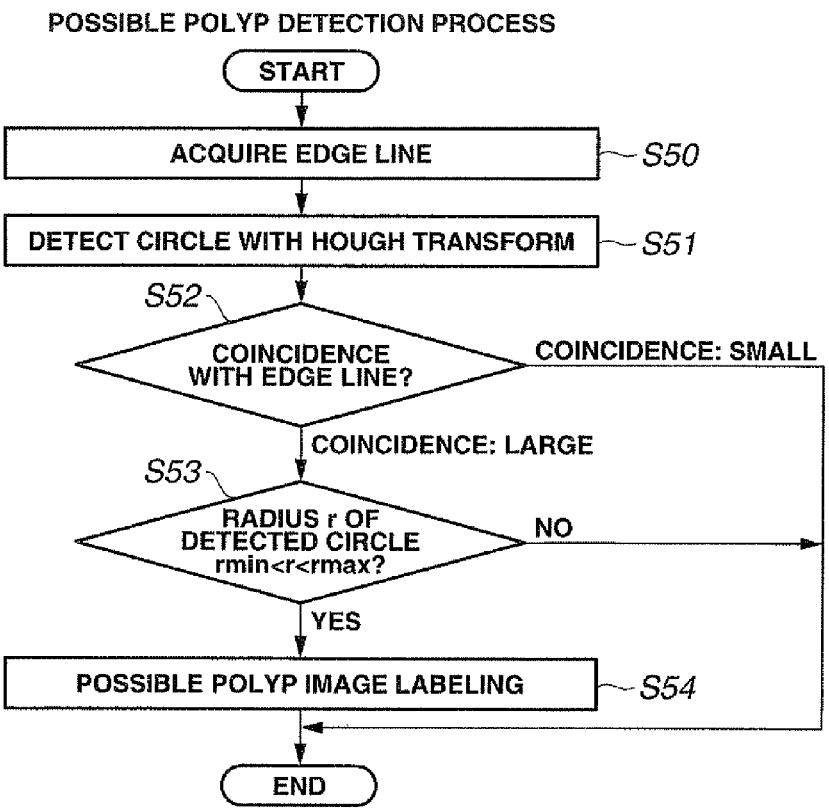
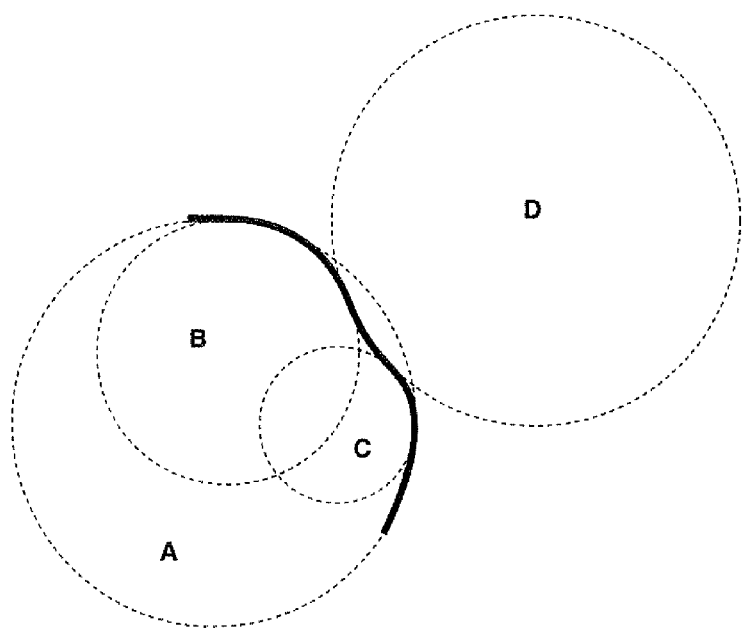

MORPHOLOGY FILTER ACTION

PROCESS RELATED TO PIXEL (x, y)

START
↓
CALCULATE ANGLE θ FORMED BY (x, y) AND (cx, cy) — S60
↓
CALCULATE DISTANCE L BETWEEN (x, y) AND (cx, cy) — S61
↓
GENERATE ELLIPSOID SERVING AS FILTER WITH f(L) AND g(L) — S62
↓
ROTATE FILTER BY ANGLE θ — S63
↓
EXECUTE dilation PROCESS RELATED TO (x, y) AND UPDATE VALUE OF PIXEL IN AREA OCCUPIED BY FILTER — S64
↓
END

IMAGE ANALYSIS DEVICE

CROSS REFERENCE TO RELATED APPLICATION

This application is a continuation application of PCT/JP2007/054214 filed on Mar. 5, 2007 and claims benefit of Japanese Application No. 2006-069818 filed in Japan on Mar. 14, 2006, the contents of which are incorporated herein by this reference.

BACKGROUND OF INVENTION

1. Field of the Invention

The present invention relates to an image analysis device that detects a polyp from a medical image.

2. Description of the Related Art

In the medical field, a diagnosis has been widely performed using an image pickup instrument such as X-ray, CT, MRI, ultrasound observation device, and endoscopic device.

For example, in an endoscopic device, a diagnosis can be performed by inserting an elongated insertion section in a body cavity and using an image pickup section such as a solid-state image pickup device to thereby observe intracavital organs on a monitor screen. An ultrasound endoscopic device is also widely used that is capable of detecting or diagnosing by irradiating ultrasound to the intracavital organs and observing the conditions of the intracavital organs with a monitor screen based on the reflection or the transmittance of the ultrasound.

The conclusive diagnosis using images picked up by these devices is largely dependent on the subjectivity of the doctor. Thus, there is a diagnosis supporting device that supports the doctor's diagnosis by calculating a feature value related to an image to be picked up using an image analysis method and presenting objective and numerical diagnosis supporting information to the doctor.

The feature value herein denotes a numerical value that reflects various findings on the image and can be obtained by applying the image analysis method.

For example, in an endoscopic image, a finding related to the color tone such as redness of mucous surface, a finding related to the shape of blood vessels such as bending and meandering of blood vessels observed in a transparent blood vessel image, and a finding related to the mucous pattern in the gastric area are important factors in malignancy diagnosis of lesion. Non-Patent Document 1 ("Digestive Endoscopy", 2001 Vol. 13 No. 3 vol. 13, Tokyo Igakusha P349-354) is an example of discrimination of lesion malignancy based on a mucous finding and a finding related to the shape of blood vessels.

For example, in Japanese Patent Application Laid-Open Publication No. 2005-157902 and other documents, an image analysis method is disclosed that is capable of improving the lesion determination accuracy based on an objectified result of the findings using the feature value. In Japanese Patent Application Laid-Open Publication No. 2005-157902, blood vessels in the digestive tract image are extracted as a linear pattern for use in the lesion determination in the image analysis method.

SUMMARY OF THE INVENTION

One aspect of the image analysis device of the present invention comprises an abnormal tissue existence determination processing section for determining whether an intraluminal abnormal tissue exists based on data of pixels or small areas of an intraluminal image.

BRIEF DESCRIPTION OF THE DRAWINGS

FIG. 7 is a flow chart showing a flow of a process of an image analysis program executed by a CPU of FIG. 1;

FIG. 8 is a flow chart showing a flow of the image analysis process of FIG. 7;

FIG. 9 is a first diagram for describing a gray value gradient calculation process of FIG. 8;

FIG. 10 is a second diagram for describing the gray value gradient calculation process of FIG. 8;

FIG. 12 is a flow chart showing a flow of a possible polyp detection process of FIG. 8;

FIG. 13 is a diagram for describing a modified example of the image analysis process of FIG. 8;

FIG. 16 is a flow chart showing a flow of a possible polyp detection process of FIG. 15;

FIG. 17 is a diagram for describing the possible polyp detection process of FIG. 16;

DETAILED DESCRIPTION OF THE PREFERRED EMBODIMENT(S)

The embodiments of the present invention will now be described with reference to the drawings.

First Embodiment

Figure 1:
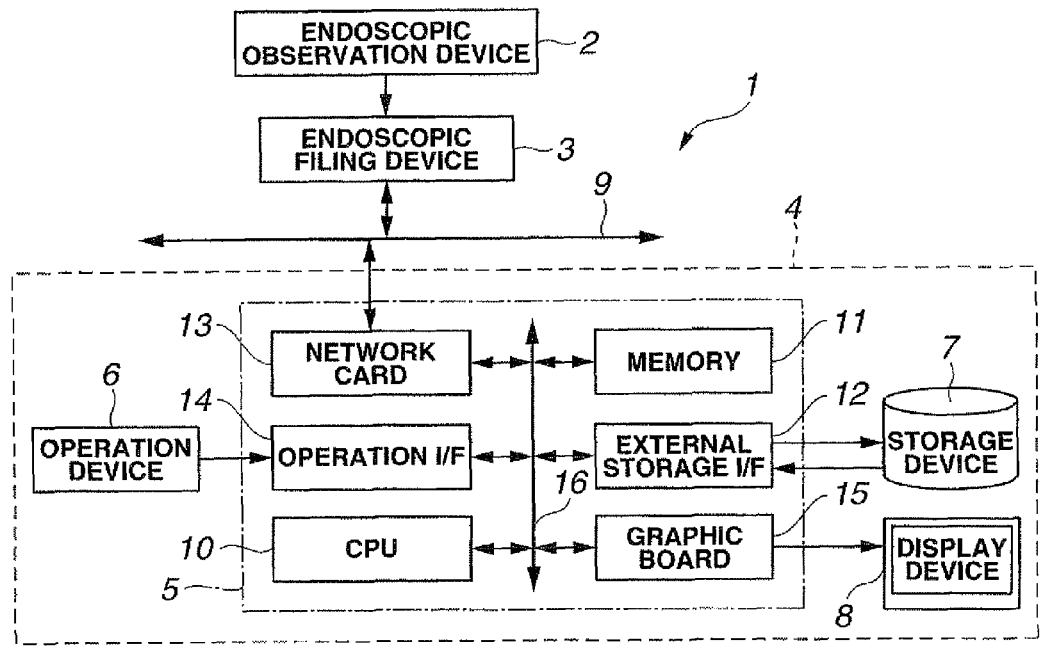
FIG. 1 is a configuration diagram showing a configuration of an endoscopic image analysis device according to a first embodiment of the present invention.
Figure 2:
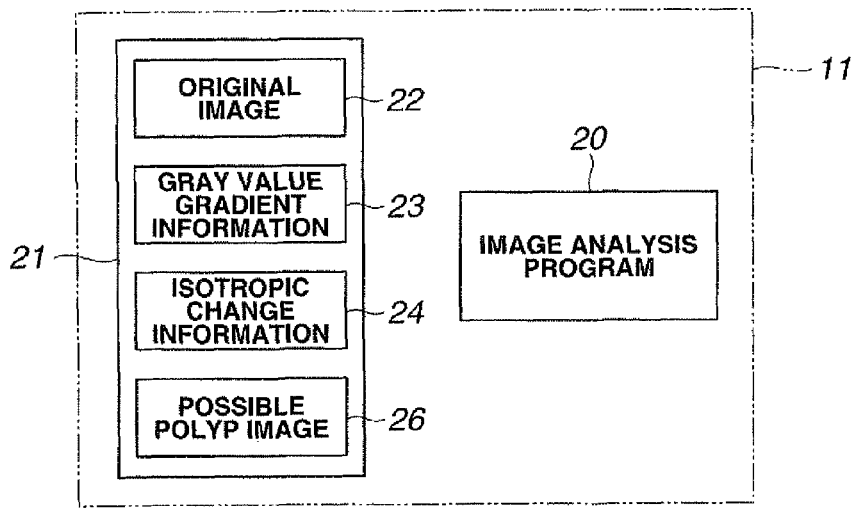
FIG. 2 is a diagram showing information stored in a memory of FIG. 1.
Figure 3:
FIG. 3 is a first diagram for describing an action of an image processing device of FIG. 1.
Figure 4:
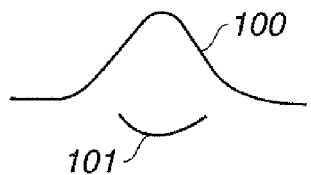
FIG. 4 is a second diagram for describing an action of the image processing device of FIG. 1.
Figure 5:
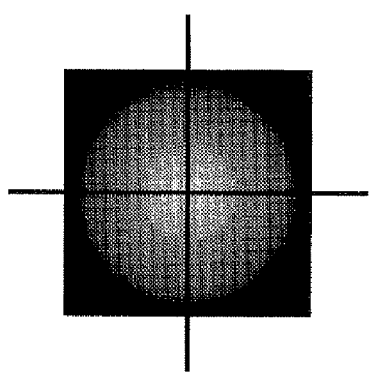
FIG. 5 is a third diagram for describing an action of the image processing device of FIG. 1.
Figure 6:
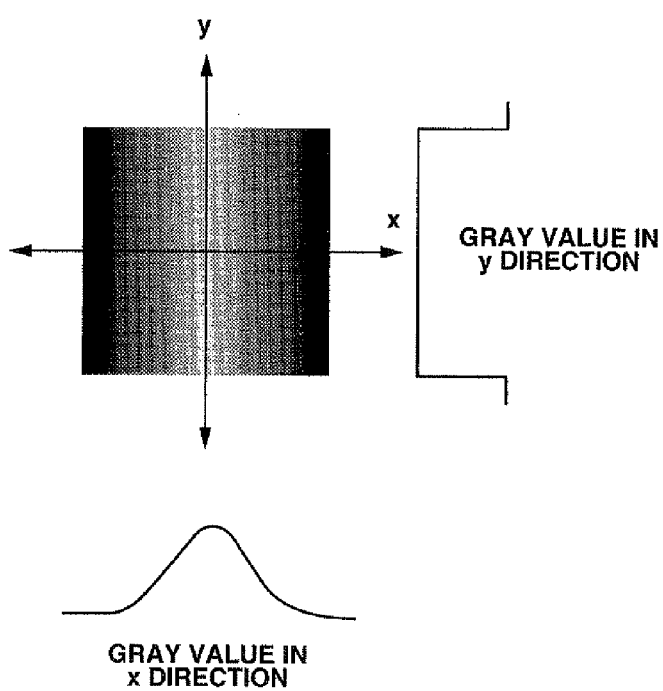
FIG. 6 is a fourth diagram for describing an action of the image processing device of FIG. 1.
Figure 11:
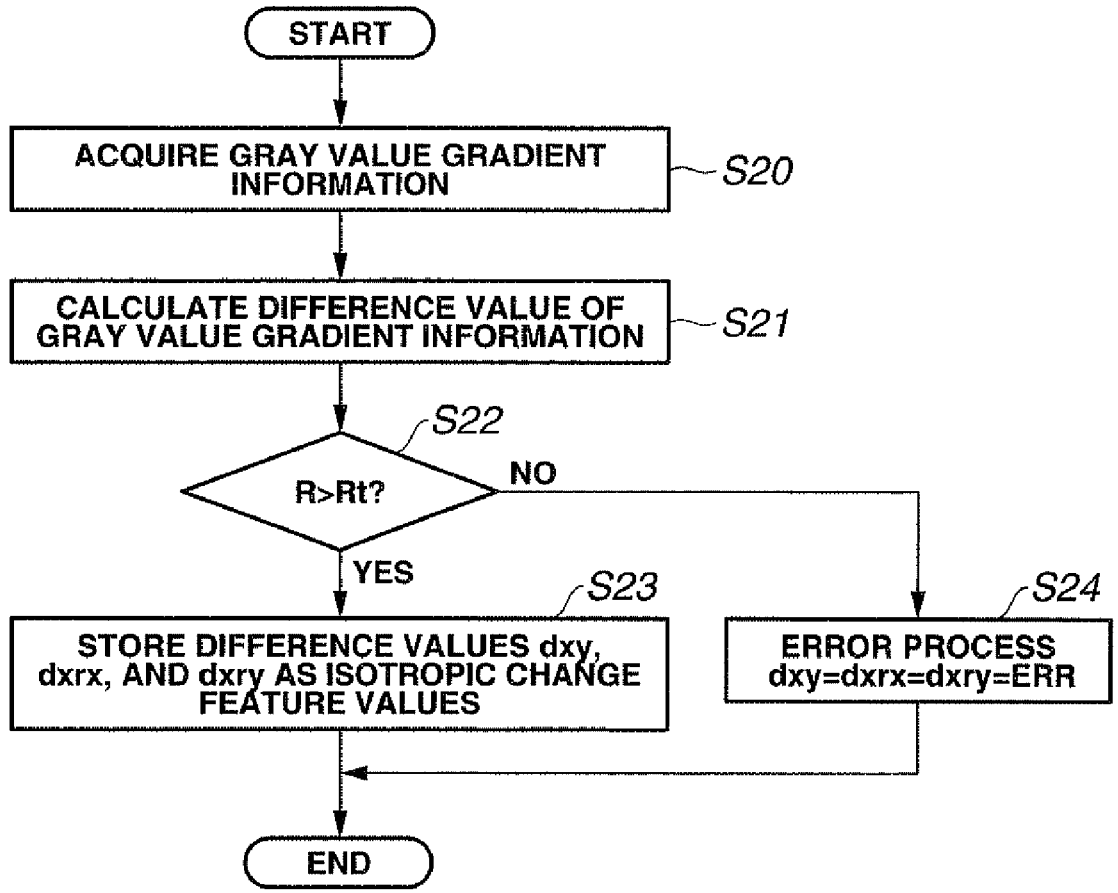
FIG. 11 is a flow chart showing a flow of an isotropic change feature value calculation process of FIG. 8.

FIGS. 1 to 13 are related to a first embodiment of the present invention. FIG. 1 is a configuration diagram showing a configuration of an endoscopic image analysis device. FIG. 2 is a diagram showing information stored in a memory of FIG. 1. FIG. 3 is a first diagram for describing an action of an image processing device of FIG. 1. FIG. 4 is a second diagram for describing an action of the image processing device of FIG. 1. FIG. 5 is a third diagram for describing an action of the image processing device of FIG. 1. FIG. 6 is a fourth diagram for describing an action of the image processing device of FIG. 1. FIG. 7 is a flow chart showing a flow of a process of an image analysis program executed by a CPU of FIG. 1. FIG. 8 is a flow chart showing a flow of the image analysis process of FIG. 7. FIG. 9 is a first diagram for describing a gray value gradient calculation process of FIG. 8. FIG. 10 is a second diagram for describing the gray value gradient calculation process of FIG. 8. FIG. 11 is a flow chart showing a flow of an isotropic change feature value calculation process of FIG. 8. FIG. 12 is a flow chart showing a flow of a possible polyp detection process of FIG. 8. FIG. 13 is a diagram for describing a modified example of the image analysis process of FIG. 8.

(Configuration)

As shown in FIG. 1, an endoscopic image analysis device 1 of the present embodiment comprises an endoscopic observation device 2 that picks up an image inside a living body and that outputs an analog image signal, an endoscopic filing device 3 that generates image data from the analog image signal outputted from the endoscopic observation device 2 and that stores the generated image data, and an image processing device 4 that executes an image analysis process.

The image processing device 4 comprises: an information processing device 5 that executes information processing; an operation device 6 including a keyboard, a mouse, and the like; a storage device 7 including a hard disk and the like; and a display device 8 including a display section such as a CRT, a liquid crystal display, or a plasma display.

The endoscopic filing device 3 and the information processing device 5 are connected, for example, to a LAN 9 with TCP/IP as the protocol, and are capable of mutual communication.

A general personal computer is used as the information processing device 5, the computer acquiring the image data stored in the endoscope filing device 3 through the LAN 9, executing an image analysis process to the image data, and displaying an image analysis result on a display device 8. Designating the image data to be processed, instructing acquisition of the designated image data, and instructing execution of the process are executed by an operation using the operation device 6.

In the information processing device 5, a CPU 10 as an abnormal tissue existence determination processing section that executes the control and process, a memory 11 that stores processing program data, an external storage I/F 12 that reads and writes information to and from the storage device 7, a network card 13 that communicates with an external device, an operation I/F 14 that executes input and output with the operation device 6, and a graphic board 15 that outputs a video signal on the display device 8 are connected to a bus 16 and communicate each other through the bus 16.

The network card 13 executes a data transmission and reception process with the endoscope filing device 3 connected to the LAN 9.

The operation I/F 14 receives an input signal inputted by the keyboard or the mouse of the operation device 6 and executes necessary data processing.

The storage device 7 is connected to the information processing device 5 and stores an image analysis program 20 for executing an image analysis process. The image analysis program 20 comprises a plurality of executable files, dynamic link library files, or configuration files.

The external storage I/F 12 reads out the image analysis program 20 stored in the storage device 7 and makes the memory 11 store the image analysis program 20.

As shown in FIG. 2, the memory 11 holds the image analysis program 20 and analysis data 21.

The image analysis program 20 stored in the memory 11 is a program with which the CPU 10 acquires endoscopic image data designated by the operation device 6 from the endoscope filing device 3, executes an image analysis process to the acquired image data, and executes a display process of an image analysis result to the display device 8.

The analysis data 21 stored in the memory 11 is data acquired and generated by the processes by the CPU 10. The stored analysis data 21 includes an original image 22 that is image data acquired from the endoscope filing device 3, gray value gradient information 23 generated by various processes described below, isotropic change information 24, and a possible polyp image 26.

(Action)

As shown in FIG. 3, if a large intestine polyp 100 is observed from an oblique direction using the endoscopic observation device 2, an edge 101 is observed as shown in FIG. 4. Therefore, a candidate of the large intestine polyp 100 can be detected using an edge detection method of a conventional method. However, if the large intestine polyp is observed from above, the edge cannot be observed as shown in FIG. 5. Thus, the candidate of the large intestine polyp 100 cannot be detected even if the edge detection method is used.

Meanwhile, when observing large intestine lumen folds using the endoscopic observation device 2 as shown in FIG. 6, the edge is not observed with an observation from above. Furthermore, when a virtual line is drawn in the image to observe a gray value change of pixels on the line, the large intestine polyp and the folds exhibit the same changed shape depending on how the line is drawn (for example, gray value change in the y-direction of FIG. 6). Therefore, when a detection of a large intestine polyp is attempted based on a one-dimensional gray value change (for example, gray value change in the x-direction of FIG. 6), the folds may be erroneously detected at the same time.

Thus, in the present embodiment, the above problem is solved by executing the following processes.

Specifically, in a process of the image analysis program 20 executed by the CPU 10, the CPU 10 acquires image data designated by the operation of the operation device 6 from the endoscope filing device 3 and stores the image data in the memory 11 as the original image 22 in step S1 of an original image acquisition process as shown in FIG. 7.

In step S2 of an image analysis process, the CPU 10 processes the original image 22 acquired in the original image acquisition process step S1 to generate the gray value gradient information 23, isotropic change information 24, and the possible polyp image 26 and store the generated pieces of information in the memory 11.

In step S3 of an analysis result display process, the CPU 10 executes a process of displaying an analysis process image on the display device 8, in which the possible polyp image 26 is superimposed on the original image 22.

The image analysis process of step S2 of FIG. 7 will be described using FIG. 8. As shown in FIG. 8, in step S10, the CPU 10 executes a gray value gradient calculation process described below to, for example, an R signal. Subsequently, the CPU 10 executes an isotropic change feature value calculation process described below based on a gray value gradient calculated in step S11. The CPU 10 further executes a possible polyp detection process for generating the possible polyp image 26 at a location where the polyp exists based on an isotropic change feature value calculated in step S12.

The gray value gradient calculation process of step S10 will be described first. As shown in FIG. 9, the gray value gradient calculation process obtains for each pixel, for example, a gray value gradient in relation to the R signal of the original image for each of 3 by 3 pixels around the target point.

Specifically, for example, in relation to 3 by 3 pixels around a target point R22 as shown in FIG. 10, differences of R pixel signals three pixels apart in the x and y directions are extracted. For example, the differences in relation to R22 are $g22x = R22x - R22$ $g22y = R22y - R22$ $rg22x = R'22x - R22$ $rg22y = R'22y - R22$.

As for average values of the difference values in the x and y direction, if a difference average value of an x direction component (0° direction) of the gray value gradient is defined as gx, a difference average value of a y direction component (90° direction) is defined as gy, a difference average value in the reverse direction of gx (180° direction) is defined as rgx, and a difference average value in the reverse direction of gy (270° direction) is defined as rgy, these can be obtained as $gx = \mathrm{AVE}(gijx) - \mathrm{AVE}(Rijx - Rij)$ $gy = \mathrm{AVE}(gijy) - \mathrm{AVE}(Rijy - Rij)$ $rgx = \mathrm{AVE}(rgijx) = \mathrm{AVE}(Rij'x - Rij)$ $rgy = \mathrm{AVE}(rgijy) = \mathrm{AVE}(Rij'y - Rij) i,j = 1$ to 3.

Character AVE denotes a function for returning an average value of numerical values related to i,j in the argument.

Gray value gradient information of the foregoing four directions and pixel values of the target point are recorded in the memory 11 as gray value gradient information.

The isotropic change feature value calculation process of step S11 will be described next. As shown in FIG. 11, the isotropic change feature value calculation process acquires the gray value gradient information calculated pixel by pixel in the gray value gradient calculation process in step S20 and obtains difference values of the gray value gradient information in step S21.

In the present embodiment,

Difference between gx and gy: $dxy = \mathrm{ABS}(gx - gy)$

Difference between gx and rgx; $dxrx = \mathrm{ABS}(gx - rgx)$

Difference between gx and rgy: $dxry = \mathrm{ABS}(gx - rgy)$ are calculated. Character ABS denotes a function for returning an absolute value of a numerical value in the argument.

In step S22, a pixel value R (R22 in FIG. 10) indicated by the target point and a predetermined threshold Rt are compared. If R>Rt, the three difference values are recorded in the memory 11 as isotropic change information in step S23, and the process ends.

On the other hand, if R≦Rt, dxy=dxrx=dxry=ERR (ERR is a constant value large enough to show that the value is inappropriate) is recorded in the memory 11, and the process ends.

The possible polyp detection process of step S12 will now be described. As shown in FIG. 12, the possible polyp detection process first acquires isotropic change information calculated pixel by pixel in an isotropic change feature value calculation process in step S30.

In step S31, whether dxy=dxrx=dxry=ERR is satisfied is determined. If satisfied, the processes are skipped, and if not, the following processes after step S32 are implemented.

In step S32, a predetermined threshold Dt is used to determine whether dxy<Dt, dxxy<Dt, and dyxy<Dt. If the condition is satisfied, a pixel value of the location of the possible polyp image is updated to 1 in step S33. If the condition is not satisfied, the pixel value of the location is updated to "0" in step S34.

In step S34, the possible polyp image 26, in which the pixel value of the location where the polyp exists is "1", is generated, and the process ends.

In the image processing device 4, a marker is displayed at the location where the pixel value of the possible polyp image 26 is "1", thereby superimposing on the display of the original image 22.

The processes are executed to, for example, the R signal of the original image 22. However, this arrangement is not restrictive, and the processes may be executed to a G signal or a B signal.

(Advantage)

In the present embodiment, a two-dimensional gray value change is inspected to detect polyp without an edge from the image and present the polyp as a possible lesion, thereby enabling to present the existing location of the polyp to the doctor (operator) and support the lesion detection.

In the above description, the gray value gradient information is obtained from the differences from the pixel values three pixels apart. However, a configurable parameter variable N may be set up to obtain the differences N pixels apart, enabling to adjust the scale of the gray value gradient information.

A modified example of the present embodiment will be described next. Only the different parts will be described.

In the isotropic change feature value calculation process, an element structure tensor $T^t$ related to the gray value gradient of each pixel is obtained from the following formulas (1) and (2).

[Formula 1]

$$\nabla I = [gx, gy] \quad (1)$$

[Formula 2]

$$T^t = \nabla I \nabla I^T \quad (2)$$

A Gaussian kernel in accordance with the size of the large intestine polyp to be detected is then generated. For example, when a Gaussian kernel related to the size 5 by 5 is generated, a 5 by 5 filter G shown in FIG. 13 is generated from a normal distribution function f(x) with an average value μ=0 and a dispersion σ2=1, based on

[Formula 3]

$$f(x) = \frac{1}{\sqrt{2\pi}\,\sigma}\exp\left(-\frac{(x-\mu)^2}{2\sigma^2}\right). \quad (3)$$

The values $T^I$ and G obtained for each pixel are convolved to calculate the structure tensor $T=G*T^I$ for each pixel.

An eigenvalue of T is further obtained pixel by pixel using a Householder QR method to calculate feature value $u$=minimum eigenvalue/maximum eigenvalue.

The pixel value R indicated as the target point and the predetermined threshold Rt are compared, and if R>Rt, the feature value u is recorded in the memory 11 as the isotropic change information (equivalent to step S23 of FIG. 11).

If R≦Rt, u=ERR (ERR is a constant value large enough to show that the value is inappropriate) is recorded in the memory 11 (equivalent to step S24 of FIG. 11).

The possible polyp detection process then acquires the isotropic change information for each pixel (equivalent to step S30 of FIG. 12) and determines if u=ERR (equivalent to step S31 of FIG. 12). If u=ERR, the processes are skipped, and if not, the following processes are implemented.

A predetermined threshold Ut is then used to determine whether u>Ut (equivalent to step S32 of FIG. 12). If the condition is satisfied, the pixel value of the location of the possible polyp image is updated to "1" (equivalent to step S33 of FIG. 12). If the condition is not satisfied, the pixel value of the location is updated to "0" (equivalent to step S34 of FIG. 12).

Second Embodiment

Figure 14:
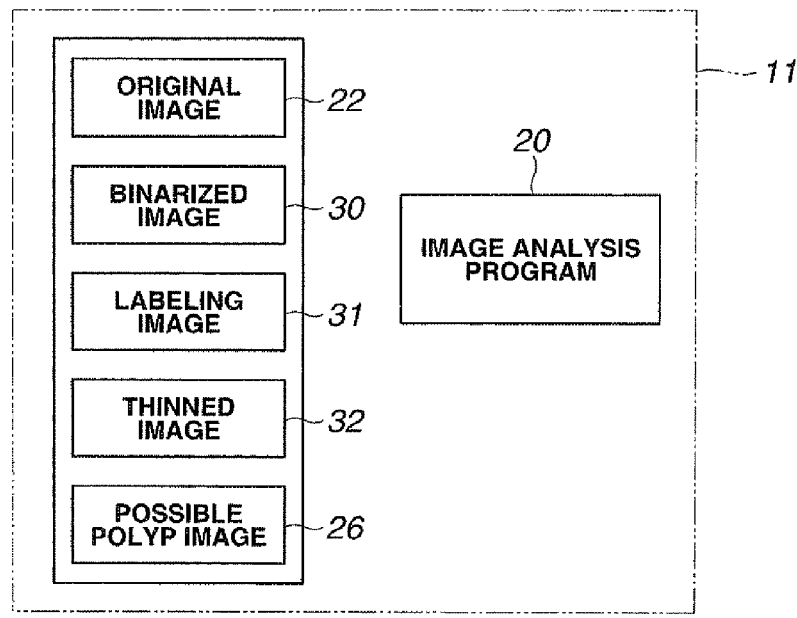
FIG. 14 is a diagram showing information stored in a memory according to a second embodiment of the present invention.
Figure 15:
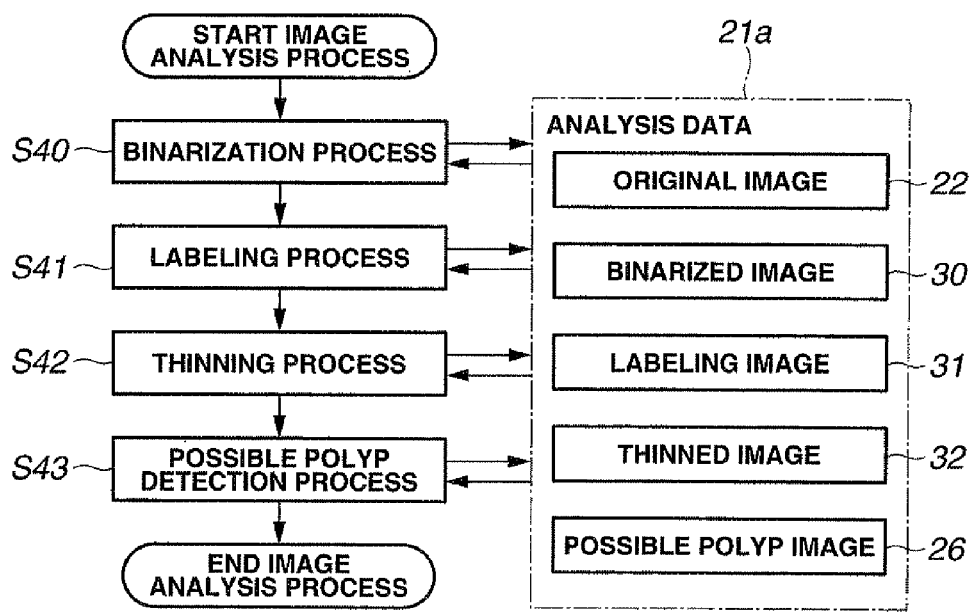
FIG. 15 is a flow chart showing a flow of an image analysis process in an image analysis program of FIG. 14.
Figure 18:
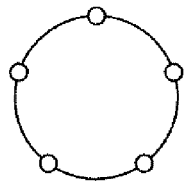
FIG. 18 is a first diagram for describing a modified example of a detection method of quasi-circular shape in the possible polyp detection process of FIG. 16.
Figure 19:
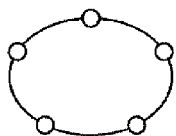
FIG. 19 is a second diagram for describing a modified example of the detection method of quasi-circular shape in the possible polyp detection process of FIG. 16.
Figure 20:
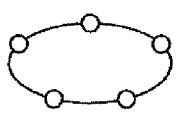
FIG. 20 is a third diagram for describing a modified example of the detection method of quasi-circular shape of the possible polyp detection process of FIG. 16.

FIGS. 14 to 20 are related to a second embodiment of the present invention. FIG. 14 is a diagram showing information stored in a memory. FIG. 15 is a flow chart showing a flow of an image analysis process in an image analysis program of FIG. 14. FIG. 16 is a flow chart showing a flow of a possible polyp detection process of FIG. 15. FIG. 17 is a diagram for describing the possible polyp detection process of FIG. 16. FIG. 18 is a first diagram for describing a modified example of a detection method of quasi-circular shape in the possible polyp detection process of FIG. 16. FIG. 19 is a second diagram for describing a modified example of the detection method of quasi-circular shape in the possible polyp detection process of FIG. 16. FIG. 20 is a third diagram for describing a modified example of the detection method of quasi-circular shape of the possible polyp detection process of FIG. 16.

The second embodiment is almost the same as the first embodiment. Therefore, only the different points will be described, and the same configurations are designated with the same reference numerals and the description will be omitted.

(Configuration)

As shown in FIG. 14, in the present embodiment, the analysis data 21 stored in the memory 11 comprises: an original image 22, which is image data acquired from the endoscope filing device 3; a binarized image 30 generated by various processes described below; a labeling image 31; a thinned image 32; and a possible polyp image 26. The rest of the configuration is the same as that of the first embodiment.

(Action)

The image analysis process of the image analysis program 20 of the present embodiment executed by the CPU 10 will be described using FIG. 15. As shown in FIG. 15, in a binarization process step of step S40, the CPU 10 uses the image analysis program 20 to execute an edge extraction process with a known Sobel filter to, for example, an R signal of the original image 22. When a pixel value obtained as a processing result is equal to or greater than the predetermined threshold Rt, the CPU 10 generates the binarized image 30 in which the pixel is "1".

The edge extraction process is executed to, for example, the R signal of the original image 22. However, this arrangement is not restrictive, and the process may be executed to a G signal or a B signal of the original image 22.

In a labeling processing step of step S41, the CPU 10 generates the labeling image 31 in which a label is allocated to each of connected components of the pixels whose pixel values of the binarized image 30 are "1".

In a thinning processing step of step S42, the CPU 10 generates the thinned image 32 in which each label value in the labeling image 31 is thinned by, for example, a known Hildich method. The thinned image 32 is an image in which an edge included in the original image 22 is extracted as an edge line formed of connected components of one pixel and a label is allocated to each connected component. Each edge includes a visible outline of an elevated possible lesion of large intestine and a visible outline of a structure other than the lesion.

The generation method of the labeling image 31 and the thinned image 32 is already known as disclosed in, for example, Japanese Patent Application Laid-Open Publication No. 2005-157902. Therefore, the description will be omitted.

The possible polyp detection process of the present embodiment is a process in which only an edge line that is highly likely an elevated lesion is extracted from the edge lines of the thinned image 32 to generate the possible polyp image 26.

FIG. 16 is a diagram showing a process flow chart in the possible polyp detection process of the present embodiment.

As shown in FIG. 16, in the possible polyp detection process, the CPU 10 acquires edge line information having a label value "1" in step S50.

In step S51, the CPU 10 executes a Hough transform related to quasi-circular shape and extracts circles constituting the edge line. FIG. 17 shows an extraction example. The example of FIG. 17 illustrates that four circles A, B, C, and D are extracted as circle elements constituting the edge line.

In step S52, the CPU 10 uses a threshold to determine a degree of coincidence of a circle with the highest coincidence with the edge line among the extracted circles. Whether the ratio between the number of pixels of the edge line of step S50 and the number of coincided pixels is greater than a predetermined value R0 is determined. In the example of FIG. 17, the circle that overlaps with most pixels constituting the edge line is a circle A, and the ratio of the number of pixels of the edge line and the number of coincided pixels is greater than R0. Therefore, the circle A is detected. If no radius of pertinent circle exists, the circle is removed from the possible large intestine polyps.

In step S53, the CPU 10 compares a radius r of the circle determined in step S52 and predetermined thresholds rmin and rmax. If rmin<r<rmax, it is determined that the pertinent edge line indicates a visible outline of polyp, and the possible polyp image 26, in which the pixel of the edge line is "1", is generated in step S54.

The CPU 10 executes the foregoing steps to each label value of the thinned image 32 and superimposes the processing results to the possible polyp image 26, thereby generating a possible polyp labeling image in which the possible polyp edge is labeled.

(Advantage)

The present embodiment superimposes the possible polyp labeling image on the original image 22 for display on the display device 8, thereby enabling to easily check the possible polyp location on the image which is the existing location of polyp.

The present embodiment may be configured to calculate a complex PARCOR coefficient based on a series of points on the edge line, discriminate and analyze the coefficient with the classification shown in FIGS. 18 to 20 as the right answer, and then detect the quasi-circular shape.

Third Embodiment

Figure 21:
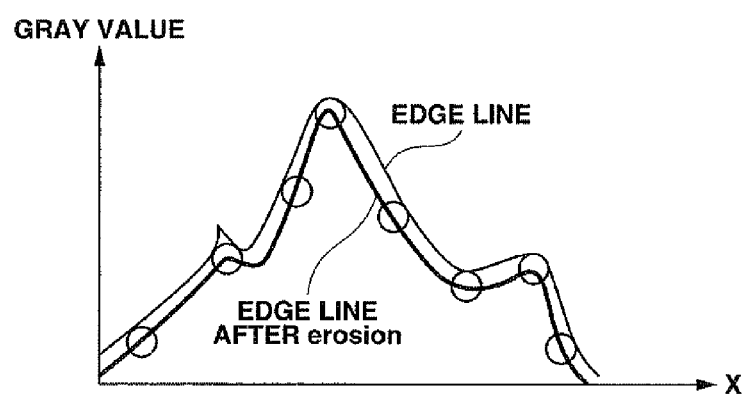
FIG. 21 is a first diagram for describing a pretreatment of an edge extraction process according to a third embodiment of the present invention.
Figure 22:
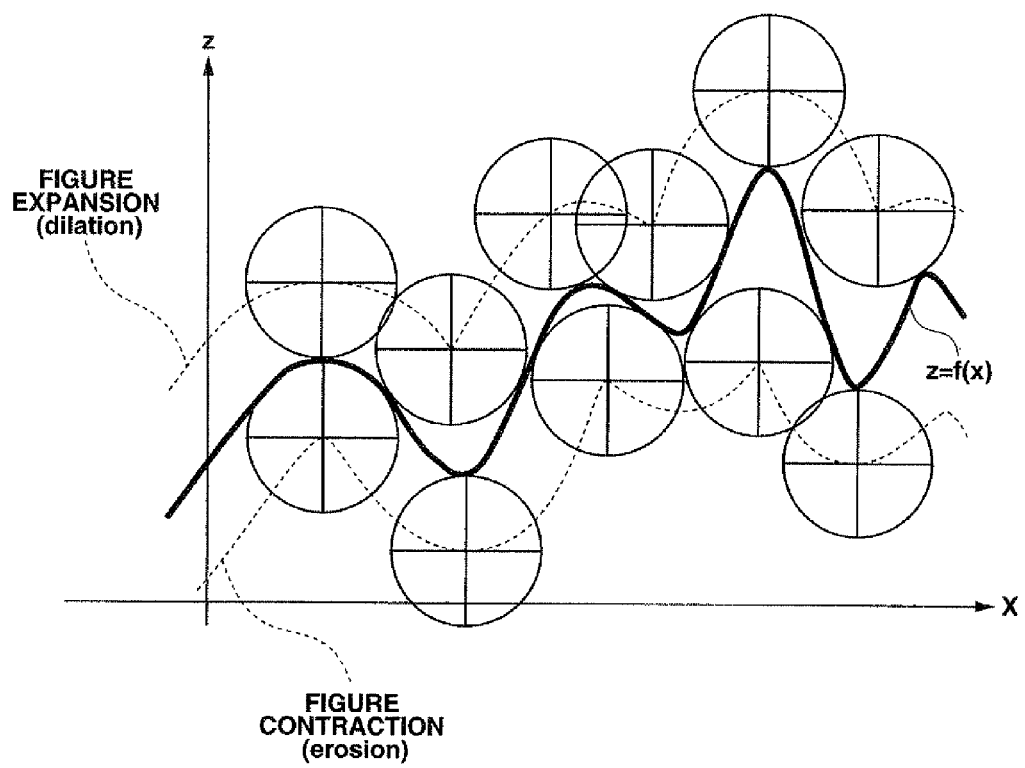
FIG. 22 is a second diagram for describing the pretreatment of FIG. 21.
Figure 23:
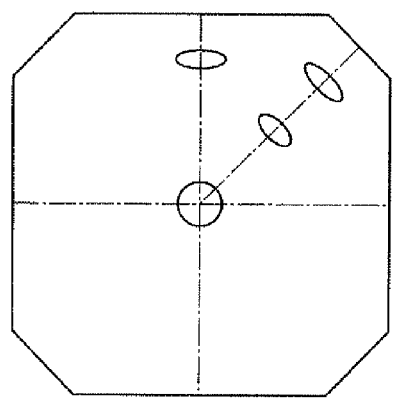
FIG. 23 is a third diagram for describing the pretreatment of FIG. 21.
Figure 24:
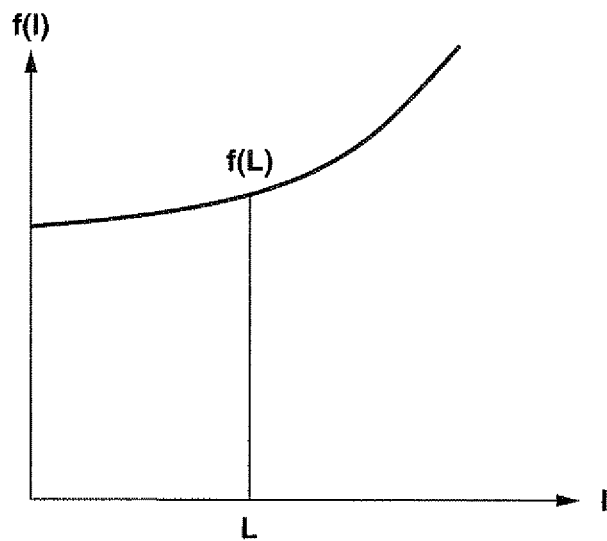
FIG. 24 is a fourth diagram for describing the pretreatment of FIG. 21.
Figure 25:
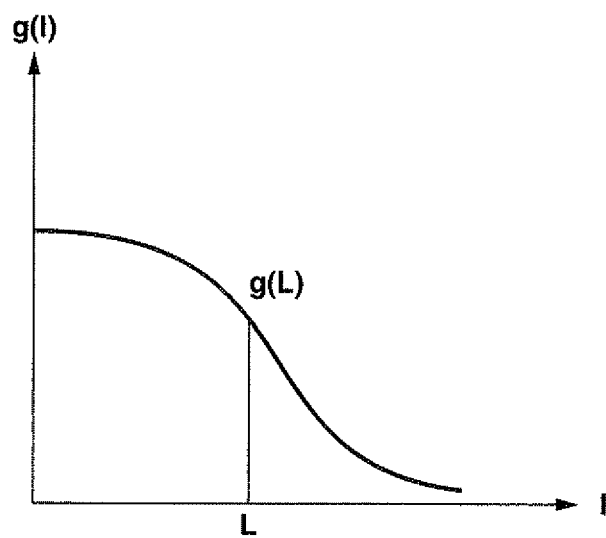
FIG. 25 is a fifth diagram for describing the pretreatment of FIG. 21.
Figure 26:
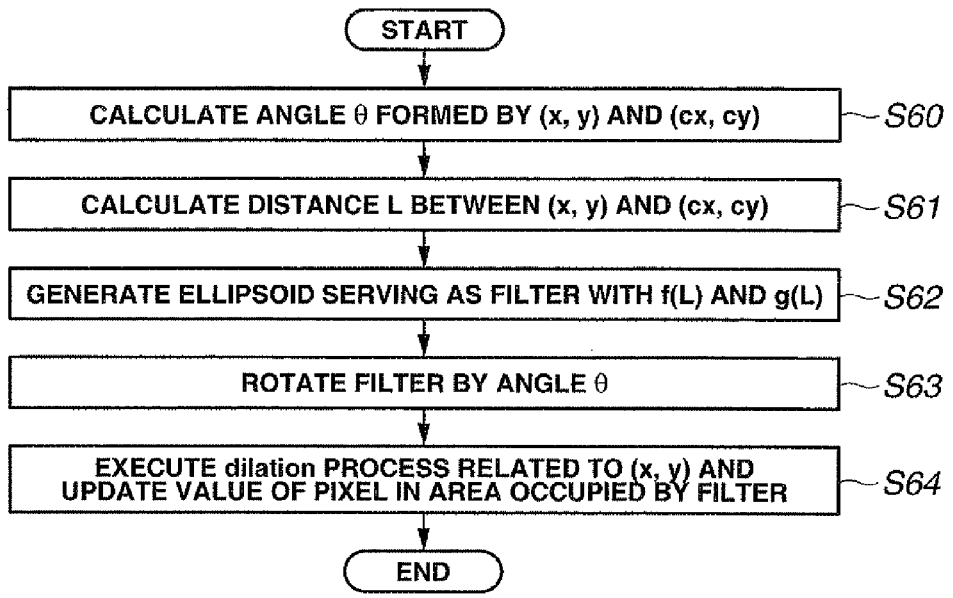
FIG. 26 is a first flow chart showing a flow of the pretreatment of FIG. 21.
Figure 27:
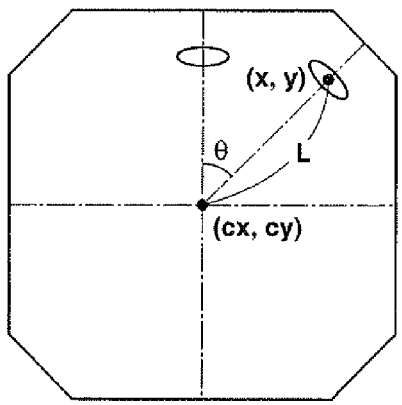
FIG. 27 is a first diagram for describing a process of FIG. 26.
Figure 28:
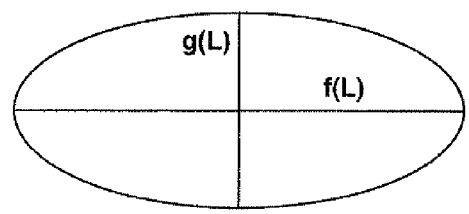
FIG. 28 is a second diagram for describing the process of FIG. 26.
Figure 29:
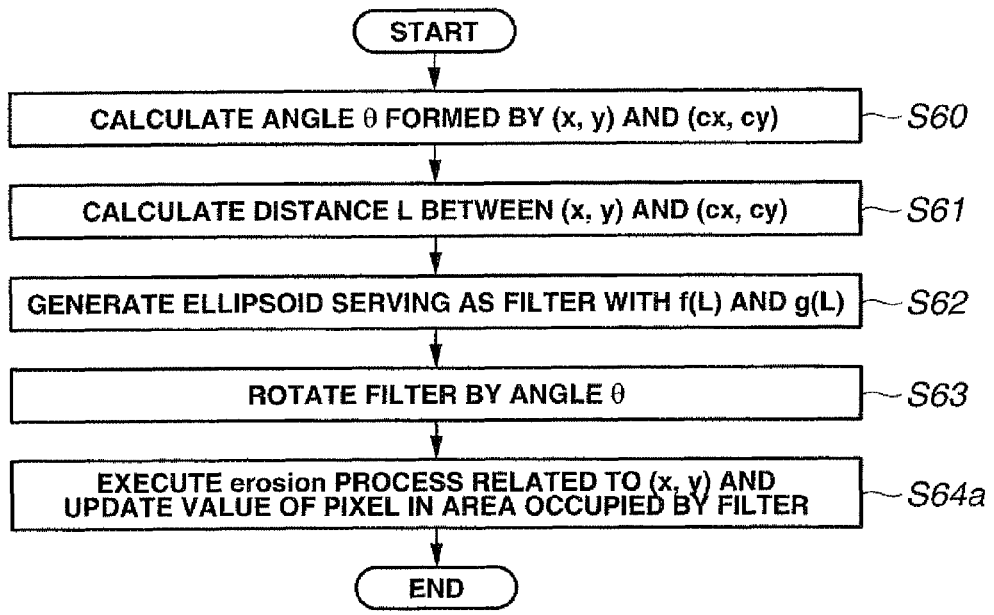
FIG. 29 is a second flow chart showing a flow of the pretreatment of FIG. 21.

FIGS. 21 to 29 are related to a third embodiment of the present invention. FIG. 21 is a first diagram for describing a pretreatment of an edge extraction process. FIG. 22 is a second diagram for describing the pretreatment of FIG. 21. FIG. 23 is a third diagram for describing the pretreatment of FIG. 21. FIG. 24 is a fourth diagram for describing the pretreatment of FIG. 21. FIG. 25 is a fifth diagram for describing the pretreatment of FIG. 21. FIG. 26 is a first flow chart showing a flow of the pretreatment of FIG. 21. FIG. 27 is a first diagram for describing a process of FIG. 26. FIG. 28 is a second diagram for describing the process of FIG. 26. FIG. 29 is a second flow chart showing a flow of the pretreatment of FIG. 21.

The third embodiment is almost the same as the second embodiment. Therefore, only the different points will be described, and the same configurations are designated with the same reference numerals and the description will be omitted.

An example of an object to be detected in a large intestine includes an elevated lesion (large intestine polyps). One method of the conventional techniques includes a method for detecting the maximum of the gray value of an image and determining the location as a possible large intestine polyp. In that case, if the maximum is steep, the maximum does not indicate a large intestine polyp, but is noise caused by content such as a minute residue. Therefore, a morphology filter is used for noise removal.

However, a distortion aberration exists in an endoscopic image. Therefore, there is a problem that the sizes of the noise at the center of an image and on the periphery targeted by the morphology filter are different.

Thus, in the present embodiment, the CPU 10 executes an appropriate process to an image with a distortion aberration to improve the detection accuracy of large intestine polyps.

In the present embodiment, the CPU 10 removes noise from the original image 22 caused by content, such as a residue, as a pretreatment of the edge extraction process in step S40 of FIG. 15 in the second embodiment. The morphology filter is generally used as a method for the noise removal.

If a steep peak as shown in FIG. 21 exists, "erosion", one of the morphology filter processes, is executed, and then "dilation", one of the morphology filter processes, is executed to remove the steep peak. FIG. 21 shows an example in which "erosion" is executed. As shown in FIG. 22, in the morphology filter, "dilation" includes a figure expansion action, and "erosion" includes a figure contraction action. Therefore, the morphology filter outputs a trajectory of the centers of spheres or ellipsoids when crawled to contact with data values targeting the spheres and the ellipsoids. The morphology filter is crawled above the data values in "dilation" and crawled below the data values in "erosion". The peaks less than the sizes of the spheres or the ellipsoids can be removed with "erosion" and "dilation".

However, the endoscopic image includes a distortion aberration so that the scales at the center of image and on the periphery are different. Therefore, as shown in FIG. 23, the actual sizes in the endoscopic image differ depending on the distance and direction from the center of the image.

If the series of processes shown in FIG. 15 in the second embodiment are executed to an image in which the distortion aberration is corrected, the problem of the scale difference depending on the image location can be avoided. However, the correction process of the distortion aberration requires much time, and the morphology filter calculation further needs to be performed.

In the present embodiment, as shown in FIGS. 24 and 25, the CPU 10 prepares functions f(l) and g(l) for outputting long axis/short axis of an ellipsoid in accordance with a distance l from the centers of both sides based on a difference specification of lens or an actual measurement value. These functions are constituted by lookup tables or formulas.

FIG. 26 shows a process flow chart when applying "dilation" of the morphology filter to an image I in the present embodiment (similar process is also executed with "erosion").

FIG. 26 illustrates a process related to a pixel (x, y). The process is applied to the entire image I to obtain a "dilation" processed image.

In "dilation" process, the CPU 10 reserves an image buffer having the same size as the image I in the memory 11 and stores a "dilation" processing result in the image buffer. As for the value of the image buffer, a pixel value of the image I is copied and stored prior to the "dilation" process.

As shown in FIG. 26, in the "dilation" process by the morphology filter, the CPU 10 obtains an angle θ formed by a targeted pixel (x, y) and a center pixel (cx, cy) of the image I in step S60 (see, FIG. 27).

In step S61, the CPU 10 obtains a distance L between the targeted pixel (x, y) and the center pixel (cx, cy) of the image I.

In step S62, the CPU 10 uses the functions f(l), g(l), and the distance L obtained in step S61 to obtain an ellipsoid whose long axis is f(L) and short axis is g(L) as shown in FIG. 28.

In step S63, the CPU 10 rotates the ellipsoid obtained in step S62 by the angle θ obtained in step S60.

In step S64, the CPU 10 executes the "dilation" process in the pixel (x, y). The processing result is stored in the image buffer having the same size as the image I. If the pixel value in an area occupied by the filter in the image buffer is larger than the pixel value of the filter processing result, the pixel value is replaced by the pixel value of the filter processing result.

FIG. 29 shows a flow chart of the "erosion" process. The "erosion" process is almost the same as the "dilation" process, and the only difference is that the "erosion" process in the pixel (x, y) is executed in step S64a in place of step S64. Therefore, the description will be omitted.

The present embodiment has been applied to the morphology filter. However, the CPU 10 may also generate a template to execute a template matching process, and the matching accuracy can be improved by executing the process while correcting the template in consideration of the distortion aberration of the image in the template matching process.

This enables to highly accurately remove noise of the image with distortion aberration and improves the accuracy rate of the possible lesion, thereby supporting the lesion detection by the doctor.

In the above embodiments, endoscopic image data in a large intestine has been used as an example of the image data, and a large intestine polyp has been described as an example of the intraluminal abnormal tissue. However, this arrangement is not restrictive, and other intraluminal image data can also be applied to detect other intraluminal abnormal tissues.

Figure 30:
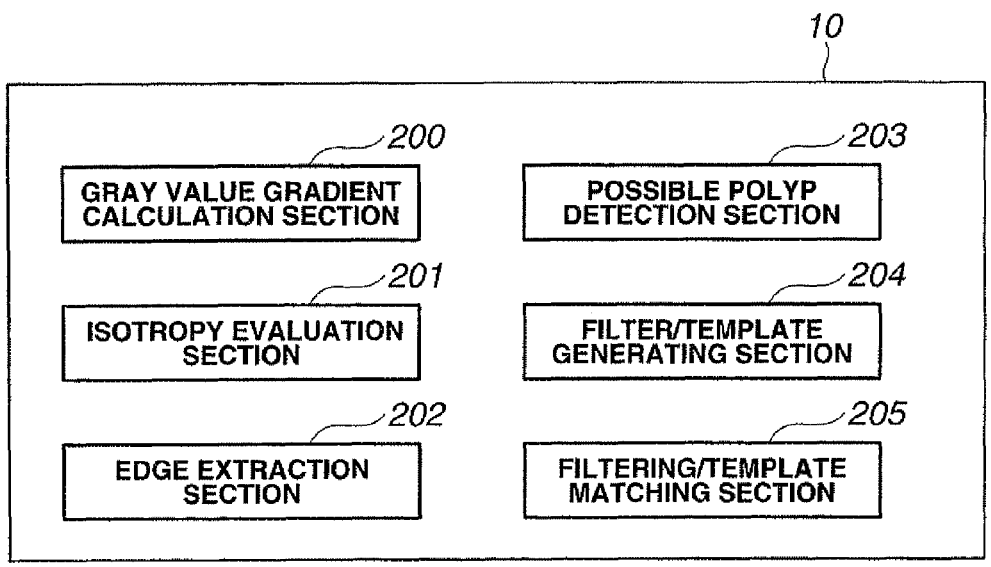
FIG. 30 is a block diagram showing a functional configuration of the CPU.

In the above embodiment of the present invention, as shown in FIG. 30, a gray value gradient calculation section 200 as a gray value gradient calculation section for executing the gray value gradient calculation process (for example, step S10 of FIG. 8), an isotropy evaluation section 201 as an isotropy evaluation processing section for executing the isotropic change feature value calculation process (for example, step S11 of FIG. 8), an edge extraction section 202 as an edge extraction processing section for executing the edge extraction process (for example, step S40 of FIG. 15), a possible polyp detection section 203 as possible abnormal tissue detection processing section for executing the possible polyp detection process (for example, step S12 of FIG. 8), a filter/template generating section 204 as a filter/template generating section for generating the morphology filter in FIG. 22, and a filtering/template matching section 205 as a filtering/template matching processing section for executing the morphology filter calculation using the functions f(l) and g(l) for outputting the long axis/short axis of the ellipsoid in accordance with the distance l from the center of image as in FIGS. 24 and 25 are constituted by the CPU 10 as an abnormal tissue existence determination processing section.

The present invention is not limited to the embodiments described above. Various changes and modifications can be made without departing from the scope of the present invention.

What is claimed is:

1. An image analysis device for analyzing an intraluminal image, the image analysis device comprising:
   a gray value gradient calculation processing section for calculating gray value gradients of pixels of the intraluminal image;
   an isotropy evaluation processing section for evaluating isotropies of the gray value gradients; and
   an abnormal tissue existence determination processing section for determining whether an intraluminal abnormal tissue exists based on the isotropy evaluation result.

2. The image analysis device according to claim 1, wherein the intraluminal abnormal tissue is a large intestine polyp.

3. An image analysis device for analyzing an intraluminal image, the image analysis device comprising:
   an edge extraction processing section for executing an edge extraction process for extracting edges in the intraluminal image;
   a possible abnormal tissue detection processing section for determining whether the edges extracted by the edge extraction processing section are edges of an intraluminal abnormal tissue, the possible abnormal tissue detection processing section including a quasi-circular shape detection processing section for detecting a quasi-circular shaped curve from the curves formed by the edges, and
   an abnormal tissue existence determination processing section for determining whether an intraluminal abnormal tissue exists based on the quasi-circular shaped curve detected by the possible abnormal tissue detection processing section.

4. The image analysis device according to claim 3, wherein the intraluminal abnormal tissue is a large intestine polyp.

* * * * *